Figure 1:
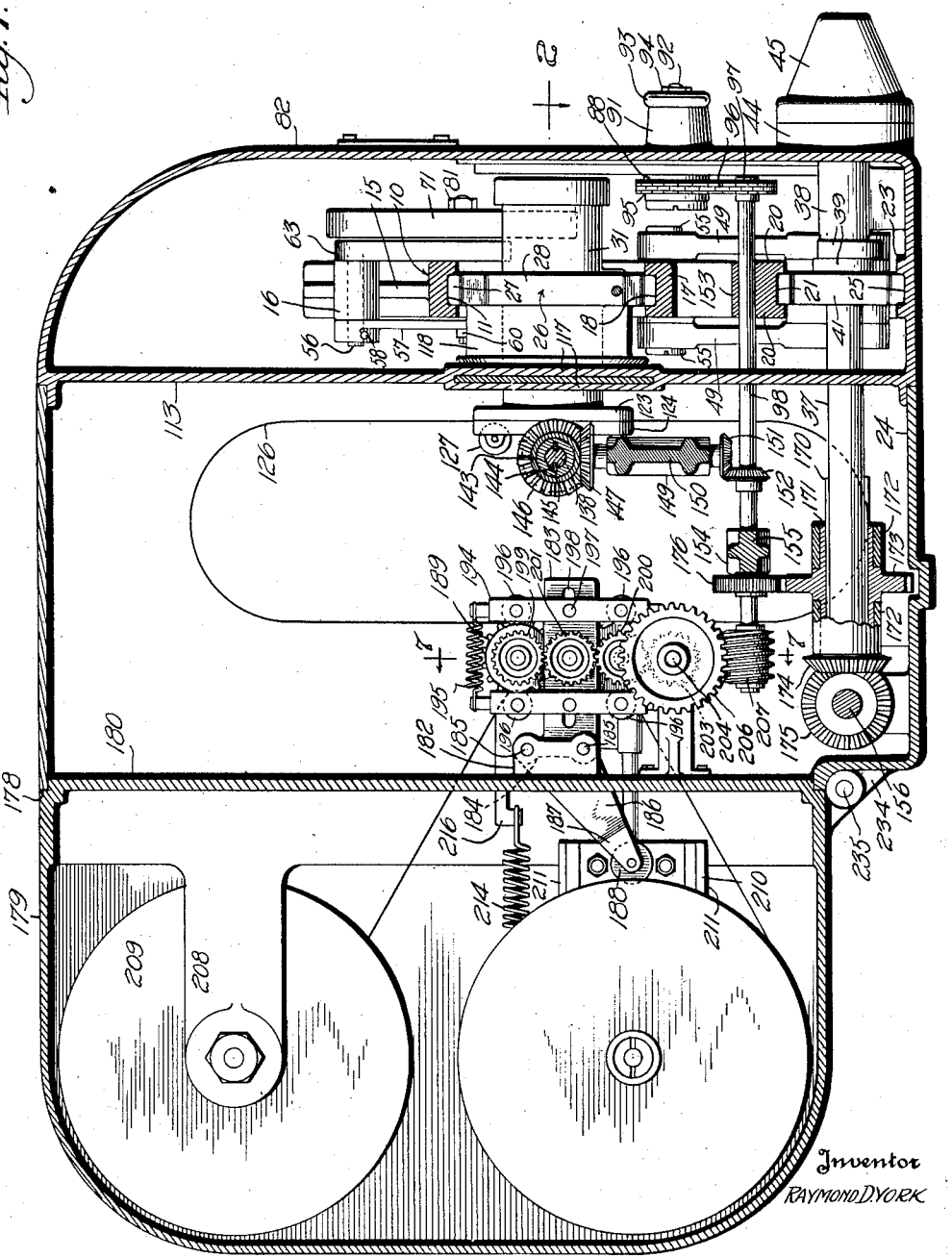

Aug. 14, 1934.  R. D. YORK  1,970,212
STEREOSCOPIC MOTION PICTURE APPARATUS
Filed March 14, 1931   6 Sheets-Sheet 4

Inventor
RAYMOND D. YORK
By C. L. Parker Jr.
Attorney

Aug. 14, 1934.   R. D. YORK   1,970,212
STEREOSCOPIC MOTION PICTURE APPARATUS
Filed March 14, 1931   6 Sheets-Sheet 5
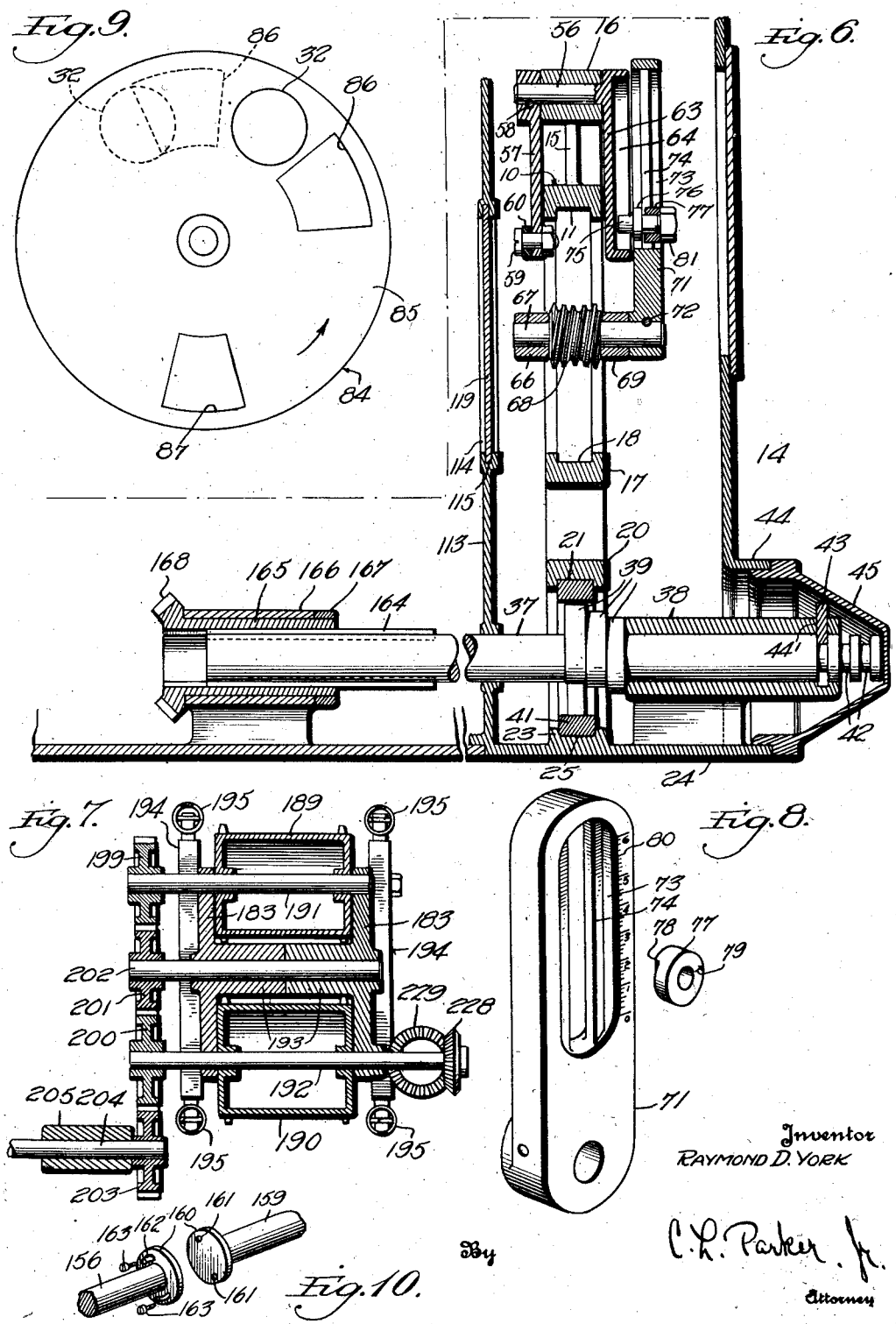
Inventor
RAYMOND D. YORK Aug. 14, 1934.   R. D. YORK   1,970,212
STEREOSCOPIC MOTION PICTURE APPARATUS
Filed March 14, 1931   6 Sheets-Sheet 6
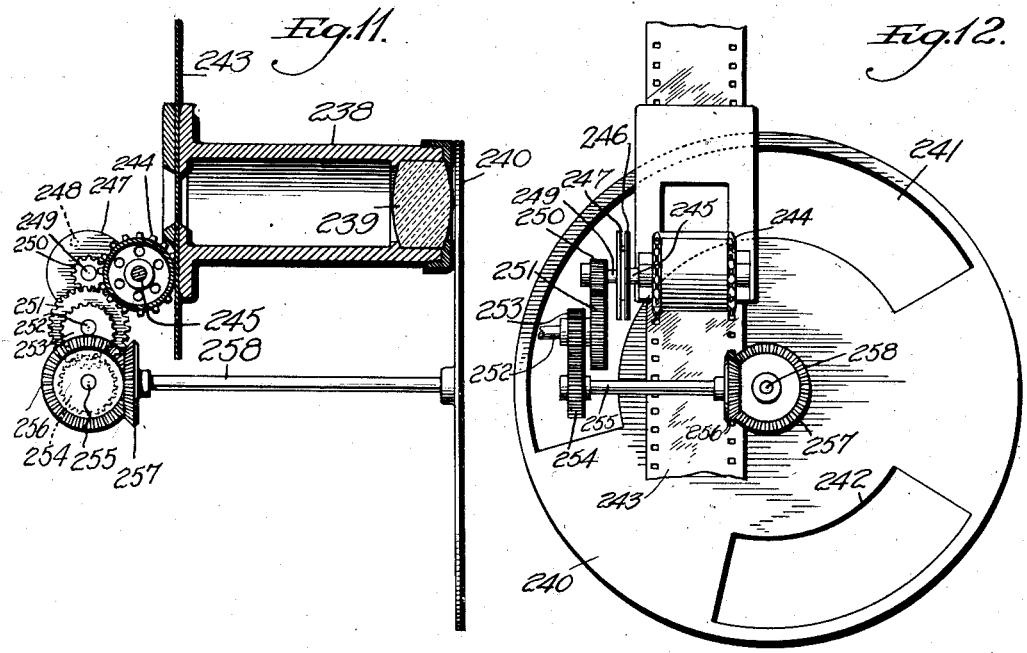
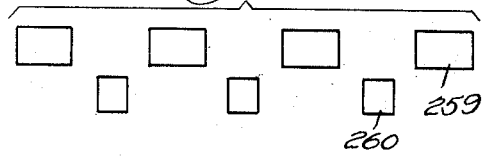
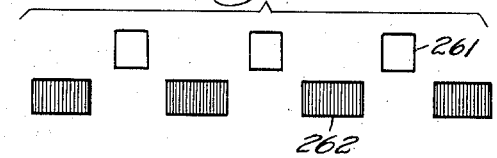
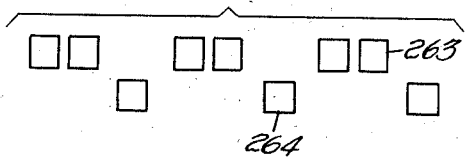
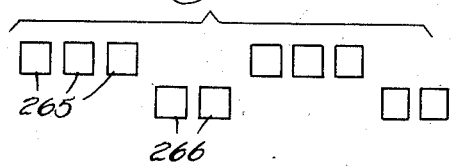
Inventor
RAYMOND D. YORK
By C. L. Parker Jr.
Attorney Patented Aug. 14, 1934

1,970,212

UNITED STATES PATENT OFFICE 1,970,212

STEREOSCOPIC MOTION PICTURE APPARATUS

Raymond D. York, University, Va.

Application March 14, 1931, Serial No. 522,659

9 Claims. (Cl. 88—16.6)

This invention relates to stereoscopic motion picture apparatus.

Numerous attempts have been made to produce stereoscopic effects in motion picture photography, due to their obvious desirability. Such efforts, however, have not met with complete success for a number of reasons. In the first place, it is well known that in order to accomplish stereoscopic effects, two or more series of pictures must be taken and projected on the screen from different angular positions. In order to do this, two separate film strips must be employed together with separate lens units in the camera and projecting apparatus, and the film strips must be perfectly synchronized. This method obviously is objectionable because of the difficulty in producing perfect synchronism between the picture strips.

The method commonly employed for producing stereoscopic effects in motion picture photography is to provide a single film strip and lens unit, and to move these elements successively back and forth between the two "eye" positions. In the practice of this method, it is necessary to move the lens and film strip rapidly to one position, hold it motionless in such position, expose the film, rapidly move the film and lens to the other position, and so on. It is necessary to suddenly stop the lens and film at each successive position, and this requirement offers difficulties because of the inertia of the moving parts. Accordingly, it is extremely difficult to eliminate the jumping and blinking effects of the picture due to the jarring of the parts when stopping them at each successive position.

Either of the two methods referred to offers a further and more serious difficulty which has not been overcome even to the extent to which the previously referred to difficulties have been remedied. In stereoscopic photography it is necessary to "aim" the apparatus at the object and accordingly the axes of the lens in its two or more positions intersect at an angle with the result that objects in the foreground and background jump back and forth parallel to the line of movement of the lens and film between their two positions.

It is well known that the image of each picture on the projecting screen is retained in the retina until the next successive picture is projected. With the stereoscopic systems referred to, every other picture will show its elements in one relative position and the intervening pictures in another position due to the jumping effect referred to. Such alternate pictures are of equal intensity due to equality in the time of exposure and projetcion of each individual picture, and the stereoscopic effect of the picture as a whole accordingly is entirely satisfactory.

I have found that a different method of photography and/or projection may be practiced to minimize the jumping effect referred to and thus render the stereoscopic results wholly satisfactory. This method may be practiced with either of the two general forms of apparatus outlined, namely, that wherein two separate films and lenses are employed, and that wherein a single lens and a single film are moved back and forth between two or more "eye" positions. The apparatus to be later described in detail is admirably adapted for eliminating the jumping or blinking effects ordinarily caused by the difficulty in overcoming the inertia of the moving parts in the form of apparatus which employs a single lens and film strip.

As previously stated, it is the common practice to equally expose and project the two series of pictures, which conditions accentuates the jumping action, which is particularly noticeable in the background. In the new method referred to, I propose to cause one series of pictures to predominate over the other either as to time or light intensity, or both, in the camera and/or projecting apparatus. For example, one series of pictures may be caused to predominate over the other in light intensity by overexposing one series of pictures during the photographic operation, or by using a more intense source of light for one series of films in the projecting apparatus. If desired, both methods may be adopted, namely, the slight over-exposure of one series of pictures and the use of a source of light of slightly greater intensity for one series of pictures in the projecting apparatus.

To secure over-exposure in the photographic operation, it will be apparent that either a greater length of exposure may be provided for one series than the other, or a larger diaphragm opening may be employed, or both. Obviously, if a greater length of exposure is employed, no variations will be made in the normal rate of the number of exposures per interval of time, but each individual exposure of one series of pictures will be made slightly longer. Obviously, greatly lengthened exposure of one series would be impracticable since a time interval between individual exposures is to be permitted to allow for the shifting of the lens and film between "eye" positions, while it would be equally impracticable to employ too large a diaphragm opening from one series because of the broadness of the focal field. It is not essential that one series predominate to a great extent over the other, and accordingly satisfactory results can be obtained either by increased exposure or a larger diaphragm opening, but both of these methods may be practiced, if desired.

When a film exposed in the manner referred to is run through a stereoscopic projecting apparatus, it will be apparent that one series of pictures will predominate over the other on the screen due to the difference in the intensities of the two picture series resulting from the difference in exposure. This result is obtained by using two light sources of equal intensity in the projecting apparatus. Obviously, the same result may be obtained if the two picture series are equally exposed, by utilizing light sources of different intensity for the two "eye" positions in the projecting apparatus, or by utilizing different diaphragm openings, or both.

Without varying the intensity of exposure when taking the pictures, and without producing the same results with the projecting apparatus, the desired predominance of one series of pictures over the other, may be obtained by utilizing different projecting periods in the projecting apparatus. For example, the camera may be provided with a shutter and operating mechanism therefor of such a nature that the pictures of one series will be projected to the screen for slightly greater periods of time. This result may be obtained by stopping the film for an equal period of time at each "eye" position and by cutting down the length of exposure of one series by shortening one shutter opening. The same result may be accomplished by lengthening the time interval during which the film remains stationary in one of the "eye" positions and by lengthening the corresponding shutter opening.

When either of these methods is employed, there will be no difference in the normal taking of the picture, that is, the pictures of the two series will be exposed with equal intensity and will be photographed at the normal rate as to the number of pictures taken per unit of time, but the lengthening of the time of projection of the pictures of one series will reduce the time interval occurring between successive exposures. Accordingly it will be apparent that the rate of exposure as to the number of pictures per unit of time will be the same in the projecting apparatus as in the camera.

A still further modification of the method may be practiced with similar results. For example, the elements of the camera and projecting apparatus may coincide and be so synchronized as to expose and project two successive independent pictures in one "eye" position, and then one picture from the other position, and so on. Similarly, three pictures may be taken from one position, and two from the other, etc. In this way, one series of pictures may be made to predominate over the other as to the increase in the number of pictures in one series over the other.

The methods outlined above, may be compared somewhat with the action of gazing steadily at an object with one eye and constantly blinking the other. The blinking of one eye could not take place with sufficient rapidity to permit images to be retained in the retina of the eye, but the analogy between the methods outlined and the action of gazing at an object just referred to will become apparent as the description proceeds. Accordingly this analogy will be applied in the following description to differentiate between the two series of pictures by referring to one series as the "eye" pictures and the other as the "blinker" pictures. In the stereoscopic methods referred to, and in the action of gazing steadily at an object with one eye while blinking the other eye there will be a predominance of one series of pictures or images over the other. In the case of the stereoscopic methods referred to, this predominance may occur as to time of exposure or projection or light intensity, or through the photographing and projecting of a greater number of pictures in the eye series than in the blinker series. Where the term "predominance" or a similar expression occurs without qualification, as in the subjoined claims, it is therefore to be understood that this expression is intended to cover the various methods by means of which the predominance of one series of pictures over the other is obtained.

Figure 2:
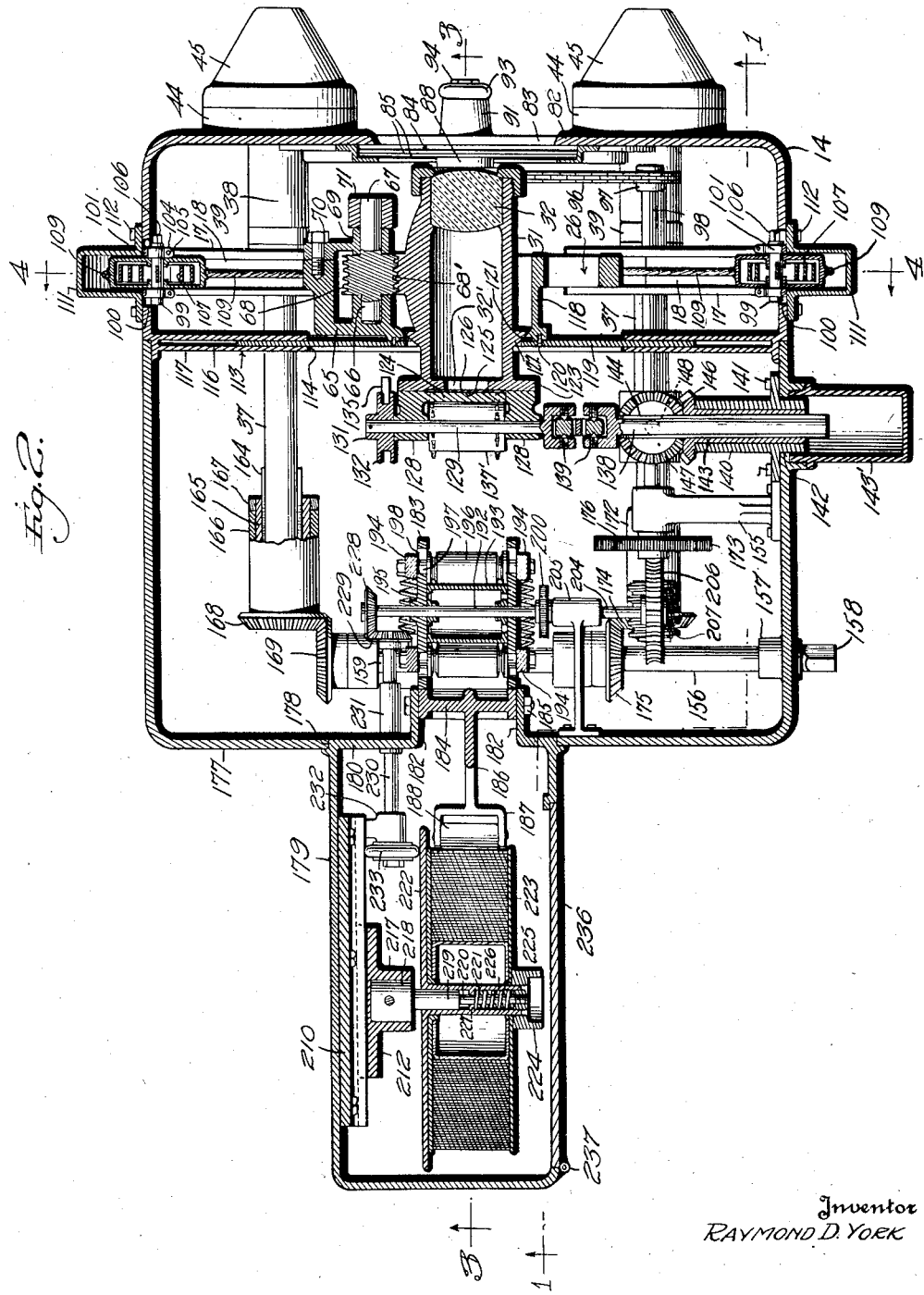
Figure 3:
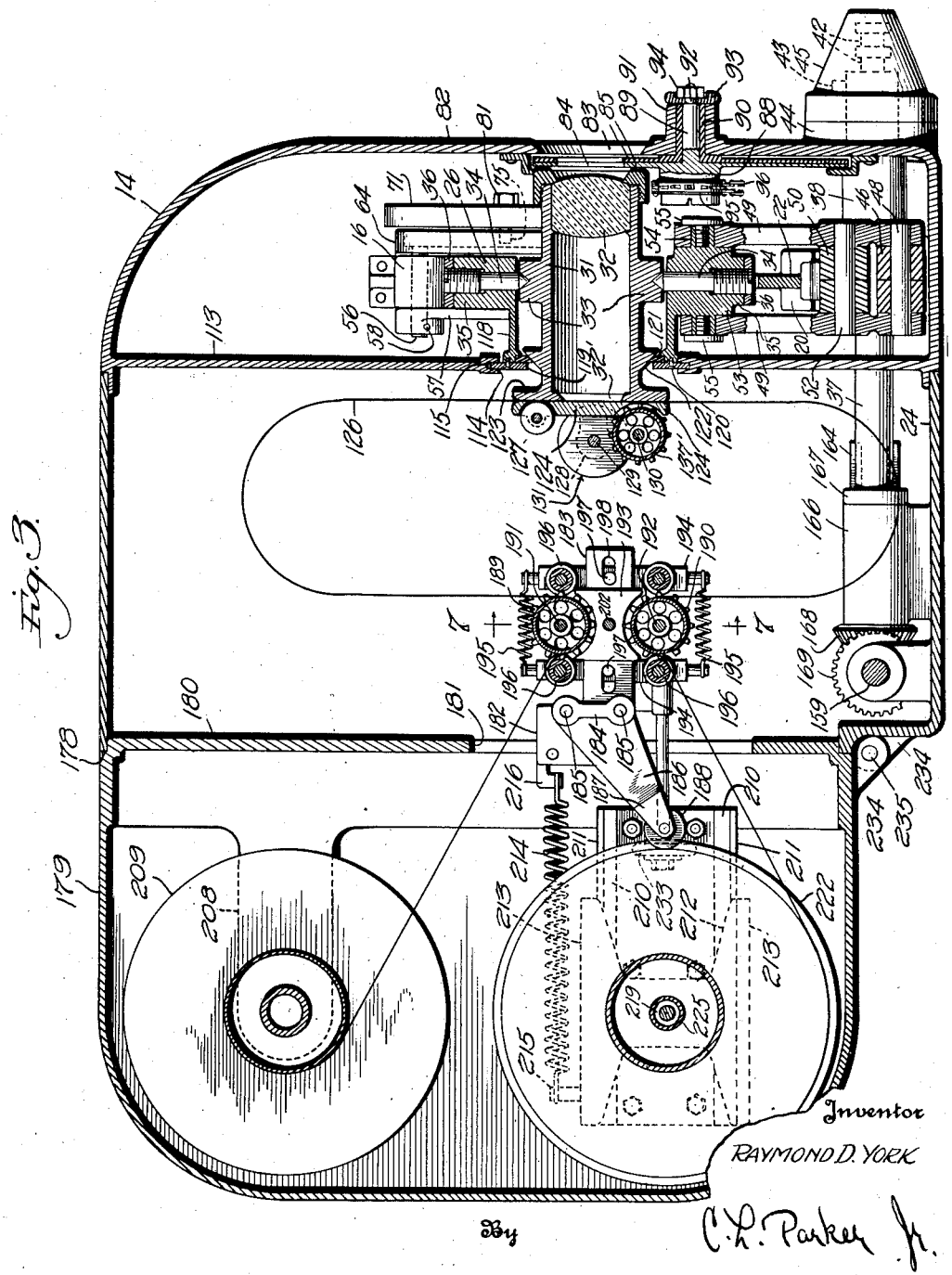

In the accompanying drawings, I have illustrated several embodiments of the invention which are particularly adapted for practicing the methods outlined. In this illustration, Figure 1 is a vertical sectional view taken substantially on line 1—1 of Figure 2, illustrating a stereoscopic camera, Figure 2 is a horizontal sectional view taken substantially on line 2—2 of Figure 1, Figure 3 is a central vertical sectional view on line 3—3 of Figure 2, Figure 4 is a transverse vertical sectional view taken on line 4—4 of Figure 2, Figure 5 is a detail view of the film feeding mechanism, Figure 6 is an enlarged vertical sectional view taken substantially on line 6—6 of Figure 4, Figure 7 is a detail vertical sectional view on line 7—7 of Figure 1, Figure 8 is a detail perspective view of a crank arm for turning the lens about a vertical axis as it moves between the two "eye" positions, Figure 9 is a diagrammatic face view of the shutter and lenses, Figure 10 is a detail perspective view of a shaft coupling, Figure 11 is a detail sectional view of a portion of a projecting apparatus, Figure 12 is a rear elevation of the same, and, Figures 13 to 16 inclusive are diagrammatic views illustrating various embodiments of the method.

Referring to Figures 1 to 4 inclusive, the numeral 10 designates a pair of upper alined guides having their inner ends spaced from each other for a purpose to be described. Each of the guides is provided in its lower face with a guide groove 11, and the outer ends of the guides are provided with upturned arms 12 secured by screws 13 or other fastening elements to the casing 14. One of the guides 10 is provided with an upstanding arm 15 terminating in a bearing 16 for a purpose to be described.

Figure 4:
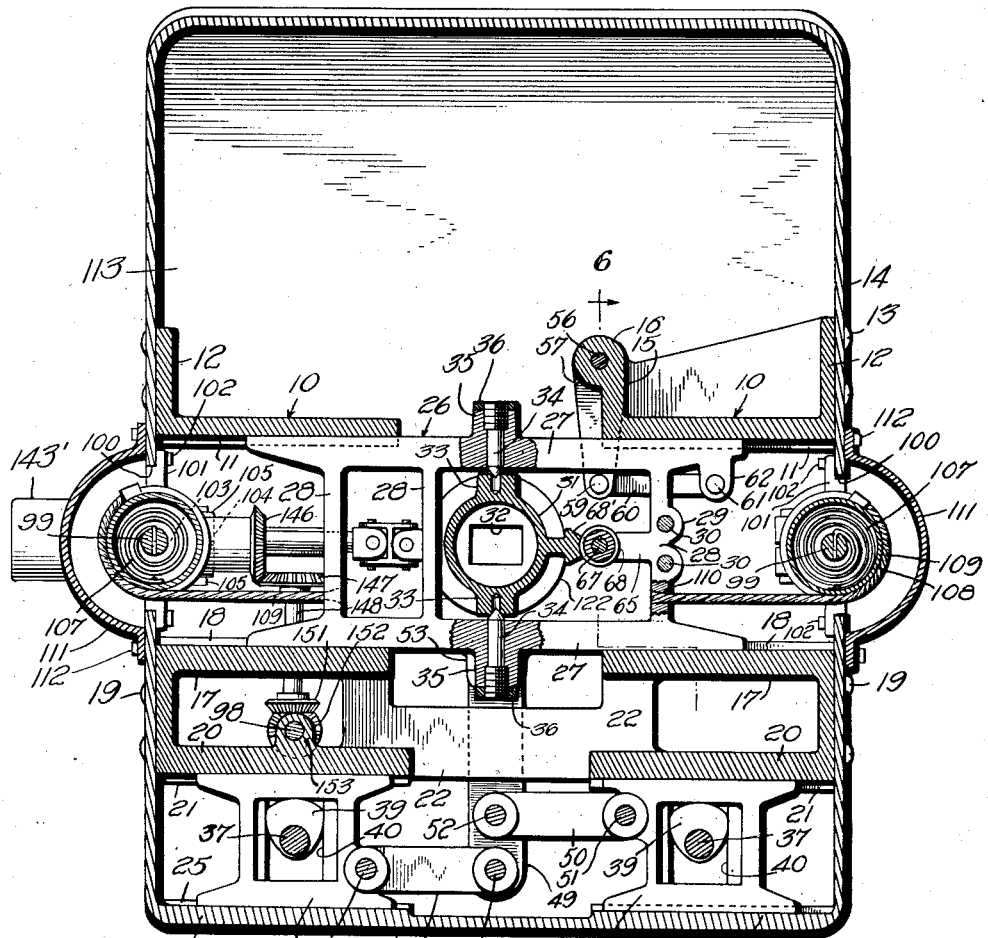
Figure 5:
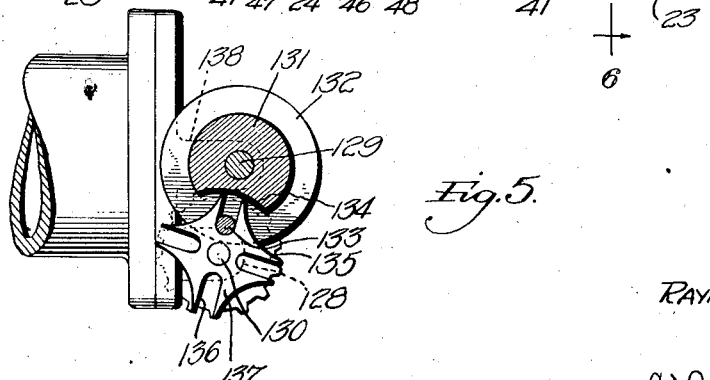

Lower guides 17 are arranged below and parallel to the guides 10 and have their inner ends spaced from each other as shown in Figure 4. Each guide 17 is provided with a guide groove 18, and the outer ends of the guides are secured to the casing by screws 19 or other fastening elements. Each guide 17 is provided with a preferably integral lower arm 20 having a guide groove 21 therein, and the two guides 17 are preferably connected to each other by an integral web 22. Each lower guide 20 coacts with a lower parallel guide 23, carried by the bottom 24 of the casing, and provided with a guide groove 25.

A crosshead 26 is mounted to reciprocate in the guide grooves 11 and 18. The crosshead includes upper and lower bars 27 connected by reinforcing webs 28 one of which is provided with bosses 29 carrying fastening elements 30 for a purpose to be described.

A lens tube 31 extends longitudinally of the apparatus and transversely through the crosshead 26. This tube carries the usual lenses 32 to project the image upon a film to be described. The lens tube has an opening 32' at its inner or rear end to define the size of the picture upon the film. Intermediate its ends, the lens tube is provided with preferably integral upper and lower bosses 33, as shown in Figures 3 and 4. These bosses are engaged by axially alined pointed screws 34 threaded through bosses 35 carried by the crosshead 26, and lock nuts 36 are adapted to secure the screws 34 in adjusted positions. It will be apparent that the lens tube 31 is adapted to reciprocate with the crosshead 26, and that it is adapted to turn about the axis of the screws 34.

A pair of cam shafts 37 is arranged near the bottom of the casing at opposite sides thereof. As shown in Figure 6, each cam shaft is journalled adjacent its outer end in a relatively long bearing 38. Each cam shaft is provided with a plurality of cams 39, as shown in Figure 6. The corresponding cams of the two shafts are arranged in openings 40 formed in crossheads 41 slidable in the guides 21 and 25. It will be apparent that as the cam shafts rotate, the cams are adapted to engage the side walls of the opening 40 to effect reciprocation of the crossheads 41. The high and low points of the cams are arcuate and concentric with the shafts 37 whereby it will be apparent that each crosshead is caused to remain stationary for a substantial interval of time at each end of its reciprocating movement.

The cams are operative in a manner to be described to effect reciprocation of the upper crosshead 26 and the distance of reciprocation of this member depends upon which of the cams 39 are opearting the lower crossheads 41. For the purpose of bringing either set of cams into operative position, each cam shaft 37 is axially slidable in its bearing 38. The cam shafts are provided with annular grooves 42. A forked member 43 is slidable through an opening 44' in each bearing 38 and is engageable in either groove 42 to retain the selected set of cams 39 in operative position in the crossheads 41. The end of each bearing carrying the forked key 43 projects from the casing through an annular flange 44, and a cap 45 covers the projecting end of the bearing 38 and the cam shaft, and is frictionally held in position by the flange 44.

The cam shaft 37 rotate in opposite directions, as will become apparent, and means are provided for utilizing movement of the crossheads 41 for reciprocating the upper crosshead 26. Referring to Figure 4, the numeral 46 designates a link pivotally connected as at 47 to one of the crossheads 41. The other end of the link 46 is pivotally connected as at 48 between the lower ends of floating levers 49. A second link 50 is arranged just above the link 46 and is pivotally connected as at 51 to the other crosshead 41. The inner end of the link 50 is pivotally connected as at 52 between the levers 49, and the pivot 52 obviously is arranged above the pivot 48.

The bottom of the crosshead 26 is provided with a depending lug 53, the central portion of which is formed by the lug 35, and integral outstanding trunnions 54 are carried by the lug 53. The upper ends of the levers 49 surround the trunnions 54 for pivotal connection therewith. Cap screws 55 are threaded in the trunnions 54 for retaining the upper ends of the levers 49 in position. It will be apparent that opposite reciprocating movement of the links 46 and 50 causes the upper end of the lever 49 to transmit a reciprocating movement to the crosshead 26 whereby the lens tube is successively moved to the two "eye" positions.

As the lens tube is moved to the two positions referred to, it swings about the axis of the pins 34 in order that the lenses may be aimed at a given object and means are provided for automatically effecting the turning movement of the tube 31. Referring to Figures 1, 2, 4, and 6, the numeral 56 designates a shaft journalled in the bearing 16 and carrying a depending arm 57 secured thereto by a pin 58. The lower end of the arm 57 is pivotally connected as at 59 to one end of a link 60, and the opposite end of this link is pivotally connected as at 61 to a depending boss 62 formed integral with the upper bar of the crosshead 26. As the crosshead reciprocates, it moves the link 60 and thus oscillates the arm 57, and this movement is transmitted to a second depending arm 63 carried by the shaft 56, as shown in Figure 6. The depending arm 63 is provided with a longitudinal groove 64.

As shown in Figures 2, 4 and 6, the crosshead web 28 which carries the bosses 29 also is provided with an arm 65 formed integral therewith and terminating at its end in a bearing 66. This bearing supports the inner end of a shaft 67, and a worm 68 is carried by the shaft 67. A second bearing 69 is provided for the shaft 67 outwardly of the worm 68, and is secured to the crosshead 26 by a screw 70. The worm 68 meshes with a segmental gear 68' carried by the lens tube 31.

Outwardly of the bearing 69, one end of an arm 71 is connected to the shaft 67 by a pin 72. Referring to Figures 6 and 8, it will be noted that the free end of the arm 71 is provided with a longitudinal opening 73 from each side of which a longitudinal rib 74 projects. A pin 75 extends through the opening in the arm 71 and is provided with a head 76 bearing against the inner faces of the flanges 74. A thimble 77 surrounds the pin 75 and is provided with an inwardly extending portions 78 having flat parallel sides contacting with the ribs 74. The thimble 77 is provided with an index mark 79 coacting with a scale 80 formed on the outer face of the arm 71 adjacent the opening 73. A nut 81 is threaded on the outer end of the pin 75 to secure it in adjusted positions. Swinging movement of the arm 63 obviously transmits a similar movement to the arm 71 through the pin 75, and thus the worm 68 will be oscillated. The degree of oscillation will depend upon the position of the pin 75 with respect to the axes of the shaft 56 and 67, which relationship may be adjusted by loosening the nut 81 and adjusting the thimble 77 with respect to the scale 80.

As previously stated, the lens tube is successively movable between its two "eye" positions, and the forward wall 82 of the casing is provided with a light opening 83 to permit the light rays to pass through the light tube to the film. The light opening is restricted in size vertically as shown in Figure 3, and is elongated horizontally as shown in Figure 2, in order that the lenses may be uncovered in each of the two positions referred to. This light opening, of course, is governed by suitable shutter mechanism for exposing the film while the lens tube remains at rest in its two positions.

Referring particularly to Figures 2, 3 and 9, the numeral 84 indicates a shutter as a whole comprising relatively rotatable disks 85 which normally rotate as a unit as will become apparent. Each shutter disk is provided with openings 86 and 87 which are adapted to successively pass by the lenses 32 illustrated diagrammatically in Figure 9. In Figure 9 the disks have been shown with their openings in registration with each other to provide the maximum exposure, but means to be described is provided for moving the shutter disks with respect to each other to place the openings of the disks slightly out of registration with each other to limit the exposure of the film.

The inner shutter disk is carried by a hub 88, which is provided with a shaft 89 extending through the front wall of the casing. The outer shutter disk is carried by a sleeve 90 surrounding the shaft 89, as shown in Figure 3. The sleeve 90 rotates in a bearing 91 carried by the front wall of the casing. The outer end of the shaft 89 is reduced as at 92 and is surrounded by a cup shaped washer 93, which contacts with the outer end of the sleeve 90. A nut 94 is threaded on the reduced end 92 and is adapted to clamp the washer 93 against the end of the sleeve 90, and thus secure the shutter disks against rotation with respect to each other in any relatively adjusted positions. This means accordingly functions for securing the adjustment of the effective shutter openings, as will become apparent. While the washer 93 clamps against the end of the sleeve 90, it does not tightly engage the end of the bearing 91, and accordingly the shutter is free to rotate.

The hub 88 is provided with a sprocket 95 about which passes a chain 96. This chain also passes around a sprocket 97 carried by a shaft 98, and it will become apparent that rotation of the shaft 98 is adapted to effect constant rotation of the shutter 84. The means for driving the shaft 98 will be referred to in detail later.

From the foregoing it will be apparent that means are provided for effecting reciprocation of the lens tube between the two "eye" positions; for swinging the lens tube about the axis of the pivot pins 34 to aim the lens tube at the object; and for successively exposing the lens in each of its two positions. As previously stated, much difficulty in securing accurate results in stereoscopic photography has resulted from the vibration of the camera or projecting apparatus due to the inertia of the moving parts which effect movement of the lenses to the two "eye" positions. Means to be described are provided for minimizing the effects of the inertia in the present apparatus to eliminate the jumping or flickering of the pictures usually resulting from the use of this type of apparatus.

Referring to Figures 2 and 4, the numeral 99 designates a shaft arranged parallel to each side wall of the casing in an opening 100 formed therein. Each shaft 99 has its ends arranged in a support 101 secured to the casing adjacent the opening 100 by fastening elements 102. Each support 101 is split as at 103 to form arms 104, and these arms are adapted to be clamped toward each other by bolts or screws 105 whereby the shaft is adapted to be fixed against turning movement in any adjusted position. As shown in Figure 2, each shaft 99 is provided with a polygonal end 106 to be engaged by a wrench or similar element whereby it may be turned to adjusted position when the bolts 105 are loosened.

A torsion spring 107 has its inner end secured to each shaft 99 and its outer end secured to a drum 108 surrounding the shaft concentric therewith. A cable or similar flexible element 109 has one end secured to each drum 108 and its opposite end extending through and secured within an opening 110 in the adjacent crosshead web 28. Each of the spring devices referred to is protected by an arcuate cover 111 secured to the casing by screws 112. The springs 107 are under constant tension, and this tension is reduced substantially to zero when the crosshead 27 reaches its closest point of approach to each spring. Obviously the tension of each spring is increased as the crosshead moves toward the opposite side of the apparatus. This increase in tension is intended to balance the inertia of the parts so as to eliminate any tendency of the crosshead 26 and the parts connected therewith to overrun either limit of their movements.

The casing is divided by a partition 113 rearwardly of and parallel to the front wall 82. This partition is provided with an opening 114 at the top and bottom of which are guide grooves 115. These guide grooves form continuations of deep recesses 116 extending from the opening 114 to the side walls of the casing, as shown in Figure 2. In order to provide the recesses 116, the partition 113 is double walled as at 117 transversely of the apparatus.

The crosshead 26 is provided with a rearwardly extending cylindrical portion 118 to the rear end of which a light sealing plate 119 is connected by screws 120. The crosshead extension 118 is recessed to receive a felt or similar sealing member 121 which seats against a spherical outstanding flange 122 carried by the lens tube 31. Accordingly it will be apparent that the felt 121 prevents leakage of light past the lens tube, while the plate 119 prevents light from passing from the forward compartment of the casing to the compartment rearwardly of the partition 113. In this connection it will be noted that the upper and lower edges of the plate 119 slide in the grooves 115 while the ends of the plate operate in the recesses 116.

The inner end of the lens tube 31 is flanged as at 123, outwardly of the light opening 32', and a film guide plate 124 is seated against the flange 123 and secured thereto. The plate 124 is recessed as at 125 to permit the passage of the film 126 between the plate 124 and the adjacent end of the lens tube. The portion of the film adjacent the upper end of the plate 124 is maintained in contact with the rear end of the lens tube by a guide roller 127.

The plate 124 is provided adjacent opposite sides thereof with bearings 128 in which is journalled a shaft 129. These bearings also support a lower shaft 130, and as shown in Figure 5, these shafts are connected by a Geneva gear whereby a step by step rotating movement may be imparted to the shaft 130 by constantly rotating the shaft 129. Referring to Figures 2 and 5, the numeral 131 designates a spool carried by the shafts 129 and provided with spaced parallel flanges 132 connected by a pin 133. The portion of the spool between the flanges 131 is provided with an arcuate cut away portion 134, for a purpose to be described.

The shaft 130 is provided with a star wheel 135 in the form of the usual Maltese cross having radial slots 136 formed therein. Each portion of the star wheel between the slots 136 is formed arcuate in shape as at 137 and of a radius equal to the radius of the portion of the spool 131 lying between the flanges 132. It will be apparent that during each revolution of the spool 131 the pin 133 will engage one of the slots 136 and will turn the star wheel 135 through a quarter revolution in accordance with conventional practice. A film engaging sprocket 137' is carried by the shaft 131, as shown in Figure 3.

Means is provided for constantly rotating the shaft 129. Referring to Figure 2, it will be noted that this shaft is driven from a shaft 138 through the medium of a double universal joint 139 which permits the adjacent ends of the shafts 129 and 138 to vary their angularity with respect to each other and also to assume slightly offset positions as is required by the oscillating movement imparted to the lens tube by the worm 68.

A bearing sleeve 140 is secured as at 141 to one of the side walls of the casing and projects outwardly through an opening 142 therein. A cylindrical cover 143' protects the outer end of the sleeve 140 and associated elements and is secured to the adjacent side wall of the casing. A rotatable sleeve 143 is journalled in the bearing 140, and the shaft 138 is slidable in the sleeve 143. Splines 144 are carried by the shaft 138 and operate in grooves 145 in the sleeve 143 whereby relative rotation between the shaft 138 and sleeve 143 is prevented.

The sleeve 143 carries a bevel gear 146 meshing with a similar gear 147 carried by a vertical shaft 148. This shaft is journalled in a bearing 149 connected to the adjacent side wall of the casing by a bracket 150. The lower end of the shaft 148 carries a bevel gear 151 meshing with a similar gear 152 secured to the shaft 98 previously described. This shaft has one end supported in a bearing 153 carried by one of the lower guides 20, and the other end of the shaft is supported in a bearing 154 connected to the adjacent side wall of the casing by a bracket 155.

Power is delivered to the apparatus through a transverse shaft 156 journalled in a bearing 157 carried by one of the side walls of the casing. The outer end of the shaft 156 is formed polygonal as at 158 for connection with a suitable flexible drive from a motor. The shaft 156 is arranged in alinement and in end to end relation with a second shaft 159, and the adjacent ends of these shafts are provided with annular flanges 160. One of these flanges is provided with threaded openings 161 and the other with arcuate slots 162, as shown in detail in Figure 10. Screws 163 pass through the slots 162 and are threaded in the openings 161. This construction permits the shafts 156 and 159 to be adjusted with respect to each other to properly synchronize the elements driven thereby.

As previously stated, each set of cams 39 is connected to one of the shafts 37. One of these shafts (see Figures 2 and 6) has spline connection as at 164 with a sleeve 165 rotatable in a bearing 166. A collar 167 is secured to one end of the sleeve 165 to prevent longitudinal movement thereof in one direction in the bearing 166, while the other end of the bearing is provided with a bevel gear 168. This bevel gear meshes with a similar bevel gear 169 carried by the shaft 159.

The other shaft 37 has spline connection as at 170 with a sleeve 171 journalled in spaced bearings 172. A spur gear 173 is carried by the sleeve 171 between the bearings 172. A bevel gear 174 is carried by the last mentioned shaft 37 and meshes with a similar gear 175 carried by the shaft 156. It will be apparent that the cam shafts 37 will be simultaneously driven by the shafts 156 and 159 and these elements are adjustable with respect to each other by means of the coupling shown in Figure 10 so that exact adjustments may be secured between the sets of cams. One of the shafts 37 also serves as drive means for the shaft 98, and for this purpose, the latter shaft is provided with a gear 176 meshing with the gear 173.

The reeling mechanism of the apparatus is shown in Figures 2, 3 and 7. The main casing 14 is provided with a rear wall 177 having a vertical opening 178. An auxiliary film spool casing 179 is arranged against the wall 177, and is substantially narrower than the main casing, as shown in Figure 2. The inner wall 180 of the casing 179 fits within the opening 178, and is provided with an opening 181 through which the film passes in a manner to be described.

At opposite sides of the opening 181, the wall 180 is provided with parallel flanges 182, as shown in Figure 2. A supporting structure is arranged between the flanges 182 and includes side walls 183 and an end wall 184. The end wall 184 fits between the flanges 182 and is provided with bolts 185 for securing it thereto. The supporting structure referred to also is provided with an arm 186 projecting into the housing 179. The arm 186 is yoked as at 187 to form arms between which is journalled a roller 188 for a purpose to be described.

Film sprockets 189 and 190 are arranged between the side walls 183 and are secured respectively to upper and lower shafts 191 and 192 journalled in the side walls 183. As will become apparent, these sprockets serve as positive means for feeding the film to and from the lens tube. In order to guide the film when threading it through the apparatus, the side walls 183 are provided with inwardly projecting bosses 193 arranged between the film sprockets and having their inner ends contacting with each other, as shown in Figure 7. The upper and lower surfaces of the bosses 193 are arcuate and concentric with the film sprockets, as shown in Figure 3.

A pair of side bars 194 is arranged against the other face of each side plate 183. The bars 194 project upwardly and downwardly beyond the adjacent film sprockets and have their ends connected by tension springs 195 to urge the bars toward each other. These side bars rotatably support idler rollers 196 which are adapted to maintain the film in contact with the sprockets 189 and 190. Each side bar 194 is provided with an inwardly projecting stud 197 operative in a groove 198 formed in the side plates 193. Thus it will be apparent that the bars 194 are prevented from partaking of vertical movement but are free to move toward and away from each other. Accordingly the springs 195 normally urge the rollers 196 against the film, but they are adapted to be spread apart to permit the film to be threaded around the sprockets.

The shafts 191 and 192 are provided with gears 199 and 200 which mesh with an intermediate gear 201. This gear is carried by a shaft 202 journalled in the bosses 193. The gear 200 meshes with a lower gear 203 carried by a shaft 204 journalled in a bearing 205. As shown in Figures 1 and 2, the shaft 204 carries a worm wheel 206 meshing with a worm 207 carried by the shaft 98 previously described. Accordingly it will be apparent that the gear train just described will be driven constantly from the shaft 98 to feed the film around the sprockets 189 and 190.

Referring to Figure 3, the numeral 208 designates reinforcing plates preferably formed integral with the side walls of the casing 179. These plates also act as bearings for supporting an upper film spool 209 from which the film is unwound during the photographic operation. The film passes from the spool 209 around the upper film sprocket 189 and then passes upwardly therefrom over a loop, as shown in Figure 3, and then past the lens tube.

A pair of parallel guides 210 is secured against each side wall of the casing 179 and these guides are provided with V-shaped guide surfaces 211. A crosshead 212 has upper and lower flanges 213 engaging the V-shaped guide surfaces 211, and accordingly it will be apparent that the crosshead is adapted to move longitudinally of the guides 211, toward and away from the casing 14. A tension spring 214 has one end connected to a pin 215 carried by the crosshead 212, and the other end of this spring is connected to a stationary hook 216 adjacent the inner end wall 180 of the casing 179. This spring obviously tends to move the crosshead 212 inwardly.

As shown in Figure 2, the crosshead 212 is provided with a recessed boss 217 receiving the enlarged inner end 218 of a shaft 219. This shaft has a reduced outer end 220 of substantial length threaded at its outer end. A sleeve 221 surrounds the shaft 219 at its reduced end, and is provided with a plate 222 at the end thereof adjacent the boss 217. A winding spool 223 is adapted to be slipped over the sleeve 221, as shown in Figure 2. One of the flanges of the film spool contacts with the plate 222. A nut 224 is threaded on the outer end of the reduced end 220 of the shaft 219 and is provided with an annular portion 225 projecting into the sleeve 221. A compression spring 226 is arranged between the annular portion 225 of the nut 224 and an annular internal flange 227 carried by the sleeve 221. The sleeve 221 is free to rotate with respect to the shaft 219 and nut 224. Accordingly it will be apparent that since the nut 224 is fixed against longitudinal movement with respect to the shaft 219, the spring 226 acts to constantly urge the film spool 223 and the plate 222 away from the nut 224.

As shown in Figures 2 and 7, the shaft 192 of the lower film sprocket 190 projects through the side plate 183 opposite the gear 200 and is provided with a bevel gear 228. This gear meshes with a bevel gear 229 carried by a shaft 230 journalled in bearings 231 and 232. The opposite end of the shaft 230 carries a friction driving member 233 engaging against one face of the plate 222. Thus it will be apparent that during the operation of the apparatus, the friction member 233 constantly rotates the plate 222, and consequently the film spool 223. The roller 188 contacts with the wound film on the spool 223, due to the tension of the spring 214. Obviously, as the film is wound on the spool 223, the spool will be urged away from the roller 188 against the tension of the spring 214. The friction driving member 233 contacts with the plate 222 at a point opposite the point of contact between the roller 188 and the film on the spool 223, and accordingly the spool will be driven at progressively lower rotating speeds as the film is wound, and the latter will be wound upon the spool at a constant linear speed.

The casings 14 and 179 are provided with ears 234 through which passes a hinge pin 235, and accordingly it will be apparent that the casing 179 is adapted to be swung downwardly and outwardly from the rear end of the casing 14. In this connection it will be noted that the sprocket supporting plates 183 and the elements connected thereto are carried by the casing 179, and these elements accordingly will be withdrawn from the main casing when the spool casing 179 is opened in the manner described. In order to permit this movement to take place, the top of the opening 181 is spaced from the hinge pin 235 a distance at least equal to the distance between the hinge pin and the tops of the innermost bars 194. In order to provide access to the casing 179 to permit film spools to be inserted and removed, a door 236 is provided in one side of the casing 179 and is hinged thereto as at 237.

As previously stated, the method outlined is applicable either to the camera or projecting apparatus or both. The apparatus previously described constitutes the photographic apparatus, and any suitable means may be employed for securing the predominance of one picture series over the other. For example, the shutter illustrated in Figure 9 is disclosed as having the shutter opening 86 somewhat longer than the shutter 87, and accordingly the series of pictures exposed by the shutter opening 86 will be somewhat denser than those exposed through the opening 87. These denser pictures minimize the passage of light therethrough, and the pictures exposed through the shutter opening 87 will predominate over the first mentioned series. Accordingly the pictures exposed through the opening 87 will constitute the "eye" pictures while those exposed through the opening 86 will constitute the "blinker" series.

In Figures 11 and 12 of the drawings, a fragmentary representation of a projecting apparatus has been shown to illustrate one application of the method thereto. The structural similarities between the camera and projecting apparatus, however, will make it apparent that the same methods can be used either in taking the pictures or projecting them, or both.

Referring to Figures 11 and 12, the lens tube 238 of the projecting apparatus has been illustrated as being provided with conventional lenses 239, and exposures through the lenses are made by means of a shutter 240. In Figure 12, the shutter is illustrated as having one elongated shutter opening 241 and a shorter opening 242 whereby it will be apparent that in the projection of the pictures, the series projected through the opening 241 will remain on the screen through a longer period of time and will constitute the "eye" series while those projected through the opening 242 will constitute the "blinker" series.

The film 243 moves downwardly rearwardly of the lens tube in the same manner as the film of the camera previously described. The feeding of the film past the lens tube is effected by means of a film sprocket 244, mounted upon a shaft 245. The shaft 245 also is rotated by a step by step movement through suitable means such as a Geneva gear, the two elements of which have been designated by the numerals 246 and 247, the latter carrying the operating pin 248. The step by step movement referred to may be identical with that previously described and need not be referred to in detail.

The element 247 of the Geneva gear is mounted upon a shaft 249 to be driven thereby. This shaft carries a pinion 250 meshing with a gear 251 carried by a shaft 252. An eccentric gear 253 also is carried by the shaft 252 and meshes with a gear 254 mounted eccentrically upon a shaft 255. The gears 253 and 254 are oppositely eccentric with respect to their shafts, and accordingly these gears remain in mesh constantly during the operation of the apparatus.

The shaft 255 may be driven in any suitable manner, such as by the drive means described in connection with the camera previously referred to. For example, the shaft 255 may be provided with a gear corresponding to the gear 151 previously described, and driven in a similar manner. The shaft 255 also carries a bevel gear 256 meshing with a similar gear 257 carried by the shutter shaft 258. Constant uniform rotational speed will be imparted to the shutter 240 by the means described, while the provision of the eccentric gears 253 and 254 transmits an uneven rotational movement to the sprocket 244. In other words, this drive is such as to permit the film to remain stationary during a somewhat longer period of time during exposure of the film through the opening 241, a shorter period of time being allowed during exposure through the opening 242.

As previously stated, the predominance of one series over the other may be accomplished in several different ways, and several of these various methods have been diagrammatically illustrated in Figures 13 to 16 inclusive. In Figure 13 for example, the "eye" series of pictures is designated by the numeral 259, while the "blinker" series is designated by the numeral 260. It will be apparent that the "eye" pictures have been illustrated as being somewhat longer than the individual "blinker" pictures, and this relative elongation is intended to illustrate predominance as to time in a projecting apparatus operating, for example, in accordance with the operation of the apparatus shown in Figures 11 and 12. In other words, each individual "eye" picture is permitted to remain on the screen for a longer period than the individual "blinker" pictures, although the sequence of all of the pictures corresponds to the usual rate of exposure in accordance with standard practice. In other words, the successive pictures will be retained in the retina of the eye in the same manner as will the usual motion pictures, but the "eye" pictures 259 will predominate over the blinker pictures 260 through their lengthened time of exposure on the screen. In this manner, the eyes of the observer will carry substantially a continuous image of the "eye" pictures which will not be materially disturbed by the insertion of the "blinker" pictures, and accordingly the jumping or blinking tendencies now present in stereoscopic motion pictures will be greatly minimized. At the same time, the presence of the shorter alternate "blinker" pictures provides an impression of perspective of the articles or objects photographed so as to carry this impression to the eyes of the observer, and thus carry out the objects of stereoscopic photography.

In Figure 14 a method has been diagramatically illustrated by means of which the same result can be accomplished with a stereoscopic camera. In this method, the "eye" pictures 261 are exposed to a normal extent to provide a normally dense series of individual pictures. On the other hand, the blinker series 262 have their individual pictures exposed through a greater period of time to provide increased film density as indicated by the shade lines in Figure 14. Thus in projecting a film taken in accordance with this method, the passage of light through the denser "blinker" pictures will be impeded because of the greater density of these pictures, and accordingly the "eye" pictures 261 will predominate on the screen as to light intensity, as distinguished from the predominance of the "eye" pictures 259 in point of time. Thus substantially the same results will be obtained by the method illustrated in Figure 14, and if desired, these two methods can be combined. In other words, in photographing the pictures the blinker pictures may be somewhat densified by slight over-exposure, and the predominance of the "eye" pictures thus taken may be somewhat emphasized in the projecting apparatus by slightly elongating their time of exposure with such an apparatus as that illustrated in Figures 11 and 12.

Slightly modified methods have been diagrammatically illustrated in Figures 15 and 16. In Figure 15, the "eye" pictures 263 have been illustrated as comprising pairs of successive pictures between which are disposed single "blinker" pictures 264. This result may be accomplished by dividing the shutter opening 241 shown in Figure 12 into two separate openings, with all of the shutter openings of the same length, and using such a shutter in connection with the camera apparatus. Thus all of the pictures will be of equal density while the "eye" series will predominate over the blinker series because of the predominance in the number of the "eye" pictures. Substantially the same idea is illustrated in Figure 16, except that the groups of "eye" pictures 265 are taken in triplicate and are interposed with pairs of "blinker" pictures 266. Such a method provides predominance of the "eye" pictures over the "blinker" pictures, but not to as great an extent as the method illustrated in Figure 15.

The operation of the apparatus illustrated in Figures 1 to 10 inclusive, for practicing the method, will be apparent from the foregoing description. A wound film spool will be placed in the top of the casing 179 and an empty spool in the bottom thereof, and the insertion of these spools is accomplished by opening the door 236. A suitable catch or locking device (not shown) is provided for locking the casing 179 in operative position, and such catch may be released to permit the casing 179 to swing downwardly. The bars 194 are spread apart to permit the film to be threaded around the upper sprocket 189, and the threading action is assisted by the curvature of the upper faces of the lugs 193. The free end of the film is then passed directly to the lens holder and threaded past the roller 127 and sprocket 137'. The free end of the film is then passed directly around the lower sprocket 190, and is secured to the empty spool 223. It will be apparent that this action takes place with the casing 179 completely open, under which conditions the distance between the sockets 189 and 190 and the lens tube will be greater than when the casing 179 is closed. Thus when the casing is closed, the film will loop above and below the lens tube, as shown in Figures 1 and 3.

The sprockets 189 and 190 will be driven through their gears 199 and 200 in the manner previously described, and accordingly it will be apparent that positive drive means for the film is provided at this point. The sprocket 137' at the rear of the lens tube will be driven by the Geneva gear illustrated in Figure 5 to impart a step by step movement to the film as it passes the lens tube. This step by step movement is permitted while the sprockets 189 and 190 rotate constantly due to the loops in the film above and below the lens tube.

The friction drive member 233 operates to positively rotate the reel 223 to wind the film thereon. As previously stated, the friction drive member contacts with the plate 222 at a point opposite the point of contact between the roller 188 and the film on the reel. The roller 188 and drive member 233 are fixed against relative movement with respect to each other, but the provision of the crosshead 212 and guides 210 permits the reel to move away from the roller 188 as the winding action progresses. Since a fixed relationship is preserved between the roller 188 and the friction drive member 233, the winding action takes place with the film moving at a uniform linear speed.

Rotation of the cams 39 is provided by driving their shafts 37 from the gears 169 and 175 in the manner previously described. These cams rotate in opposite directions as previously stated to effect relative movement between the pivot pins 48 and 52, and accordingly the levers 49 will be operated to effect reciprocation of the crosshead 26. The crosshead, and consequently the lens tube, will remain stationary during the times when the concentric portions of the cams are in contact with the side walls or their respective crossheads 41. It is during the intervals when the crosshead 26 is stationary that the exposure of the successive pictures takes place, as will be apparent.

The shutter 84 is constantly driven from the shaft 98 through the sprocket 96, and in Figure 9 of the drawings, the lens 32 has been shown in the solid line position ready to be exposed by the shutter opening 86. The shutter is rotating in the direction of the arrow shown in Figure 9, and in passing across the lens, one of the "blinker" pictures will be exposed due to the fact that the opening 86 is longer than the opening 87. When the opening 86 reaches the dotted line position shown, the exposure will have been completed, and the crosshead operating means comes into operation to transfer the lens 32 to the dotted line position illustrated. When this position is reached, the shutter opening 86 will have passed the dotted line position of the lens, and the shutter opening 87 will then come into operation to expose one of the "eye" pictures while the lens remains in the dotted line position. After this exposure has been made, the cams again operate to transfer the lens to the solid line position, whereupon the operation is successively repeated.

In order to eliminate the flickering effects resulting from the inertia of the moving parts, the spring cushion means for the crosshead 26 has been provided. As the crosshead 26 moves toward the left, as viewed in Figure 4, the left hand spring 107 will be unwound to a point of substantially zero tension, and thus will exert no force tending to pull the crosshead toward the left beyond its limit of movement. During the movement of the crosshead referred to, however, the right hand spring 107 will be wound to increase its tension, and this tension is such as to substantially balance the inertia of the crosshead 26 when the latter reaches its limit of movement. Thus the inertia of the moving parts will be overcome and the jumping tendency resulting from such cause will be eliminated.

It is preferred that the two positions of the lens tube for the "eye" and "blinker" pictures be greater for distant objects than for those closer to the camera. It is for this reason that the different sets of cams 39 have been provided. The innermost cam of each set, that is, the one shown in operative position in Figure 6, has the greatest throw, and thus these cams operate to provide maximum reciprocating movement for the crosshead 26 to photograph distant objects. For closer objects this distance may be reduced by removing the locking key 43 and sliding the cam shafts inwardly to bring one of the other cams of each set into operation. The key 43 of each cam shaft is readily rendered accessible merely by removing the covers 45.

During reciprocation of the crosshead 26, oscillating movement will be transmitted to the shaft 56 (see Figures 4 and 6) by means of the link connection between the crosshead and the arm 57. This oscillating movement is transmitted in turn to the arm 63, and thence through the pin 75 to the arm 71, and thus the worm 68 will be caused to partake of one oscillation for each reciprocation of the crosshead 26. The worm operates to swing the lens tube about the axis of the pins 34 to "aim" the lens tube at the object.

Obviously the angularity between the two photographic axes for the two positions of the lens tube should vary in accordance with the distance of the object. Accordingly means is provided for compensating for the distance of the object from the camera. For close objects, greater angularity between the axes of the two end positions is required, and under such conditions the pin 75 will be arranged substantially in the position shown at Figure 6. With the parts arranged as shown, the effective lever length of the arm 63 will be substantially at its maximum while the effective lever length of the arm 71 will be at its minimum. Thus greater turning movement will be imparted to the worm 68 and consequently to the lens tube to "aim" the lens at a relatively close object. This turning movement readily may be adjusted by removing a suitable cover plate over the front of the casing, loosening the nut 80, and sliding the thimble 77 upwardly along the arms 71 and 63. The scale 80 is provided on the arm 71 for permitting proper adjustment to be made, and this scale may be calibrated if desired in terms of the distance of the object from the lens in order that exact adjustment may be secured. The adjusting movement referred to obviously lengthens the effective length of the arm 71 and reduces that of the arm 63.

From the foregoing it will be apparent that the forms of the apparatus illustrated are particularly adapted for practicing the method. The provision of the spring means for overcoming the inertia of the crosshead 26 and the parts connected thereto eliminates the blinking or jumping of the pictures resulting from the vibration of the camera under ordinary conditions. The various means referred to for securing predominance of the "eye" series of pictures over the "blinker" series materially reduces the jumping or blinking of the objects in the background resulting from the angularity between the axes of the two lens positions. The predominating "eye" series impresses itself strongly upon the eyes of the observer so as not to be materially disturbed by the successive "blinker" pictures, but the latter series provides the desired effect or perspective to accomplish the desired object of stereoscopic photography. As previously stated, the word "predominance" or any similar expression occurring in the claims without qualification is intended to be applied in its broad sense to cover the various methods outlined. For example, the "eye" pictures may predominate over the "blinker" pictures wholly through the operation of the projecting apparatus by lengthening the period of exposure of the successive "eye" pictures. This predominance also may be accomplished wholly through the use of the camera by lengthening the exposure periods of the "blinker" pictures to densify the film and thus cause the "eye" pictures to predominate when projected, through the difference in the light intensity passing through the pictures of the two series. If desired, this predominance may be accomplished by combining the actions of the camera and projecting apparatus, or it may be accomplished as suggested in Figures 15 and 16 by increasing the total number of pictures in the "eye" series over those of the "blinker" series.

It is to be understood that the forms of the invention and the methods herein described are to be taken as preferred examples of the same and that various changes in the practice of the methods and in the size, shape and arrangement of parts may be made without departing from the spirit of the invention or the scope of the subjoined claims.

I claim:

1. Apparatus of the character described comprising a lens, means for moving said lens substantially transversely of its axis to a plurality of successive eye positions, means for advancing a film by a step by step movement past said lens and holding it stationary for an interval of time between successive movements, and means for exposing the film during each of said intervals of time, said means being operative for exposing the film to a substantially normal total amount of light in one position and to a relatively slightly greater total illumination in the other positions.

2. Apparatus of the character described comprising a lens, means for moving said lens substantially transversely of its axis to two eye positions, means for advancing a film by a step by step movement past said lens and holding it stationary for an interval of time between successive movements, and a shutter operative in conjunction with said lens and provided with a pair of openings each adapted to expose the lens in one of its two positions, one of said openings being relatively slightly smaller than the other and of a size for subjecting the film to a normal exposure.

3. Apparatus of the character described comprising a lens, means for moving said lens to a plurality of eye positions to project images to a traveling film from such positions, means controlled by movement of the lens to said positions for aiming the lens at a common object, and a shutter having a plurality of openings one of which is relatively slightly larger than the other and each of which is adapted to uncover the lens in one of its eye positions.

4. Apparatus of the character described comprising a lens, means for moving said lens substantially transversely of its axis to a plurality of successive eye positions, means for advancing a film by a step by step movement past said lens and holding it stationary for an interval of time between successive movements, means for exposing the film during each of said intervals of time, said last named means being operative for exposing the film to a substantially normal total illumination in one position and to a relatively slightly greater total illumination in the other positions, and means controlled by the transverse movement of the lens for aiming the lens at a common object.

5. Apparatus of the character described comprising a lens, a support for the lens reciprocable to either of two positions to place said lens in successive eye positions, means for advancing a film by a step by step movement past said lens and holding it stationary for an interval of time between successive movements, a shutter operative in conjunction with said lens and provided with a pair of openings each adapted to expose the lens in one of its two positions, one of said openings being relatively slightly smaller than the other and of a size for subjecting the film to a normal exposure, and means operated by movement of said support to each position for aiming the lens at a common object.

6. Apparatus of the character described comprising a reciprocable support, a lens, means for pivotally connecting the lens to said support whereby it is adapted to move therewith to successive eye positions and to alter its angular position to aim at a common object from said positions, means connected between said support and the lens for automatically changing the angular position of the latter upon each reciprocation of said support, and means for exposing the film in each of its two positions, said means being operative for providing a substantially normal total illumination for one position of the lens and a relatively slightly greater total illumination for the other position.

7. Apparatus of the character described comprising a reciprocable support, a lens, means for pivotally connecting the lens to said support whereby it is adapted to move therewith to successive eye positions and to alter its angular position to aim at a common object from said positions, means connected between said support and the lens for automatically changing the angular position of the latter upon each reciprocation of said support, and a rotary shutter operating in conjunction with said lens and provided with a pair of openings each of which is adapted to uncover the lens in one of its two positions, one of said shutter openings being adapted to provide a normal exposure for the pictures photographed from one position and the other opening being adapted to provide a slight over-exposure for the pictures taken from the other position.

8. Stereoscopic projecting apparatus comprising a lens for projecting images from a stereoscopic film to a screen, a step by step device for advancing the film past the lens, drive means for said device operative for causing the pictures of the series photographed from one eye position to remain in registration with the lens for longer periods of time than the remaining pictures, and a shutter operative in conjunction with the lens for permitting the images of the pictures of said series to be projected to the screen for relatively slightly longer periods of time than the remaining pictures.

9. Stereoscopic projecting apparatus comprising a lens for projecting images from a stereoscopic film to a screen, a step by step device for advancing the film past the lens, a shaft driving said device, a power shaft, eccentric gears connecting the two shafts whereby said device is operative for causing the pictures of the series photographed from one eye position to remain in registration with the lens for longer periods of time than the remaining pictures, and a shutter operative in conjunction with the lens for permitting the images of the pictures of said series to be projected to the screen for relatively slightly longer periods of time than the remaining pictures.

RAYMOND D. YORK.